Oct. 9, 1951     W. A. JOERNDT ET AL     2,570,813
WAVE GUIDE ATTENUATOR

Filed Oct. 8, 1948     3 Sheets-Sheet 1

INVENTORS.
WILBUR A. JOERNDT
ROLAND W. LARSON
BY
ATTORNEY

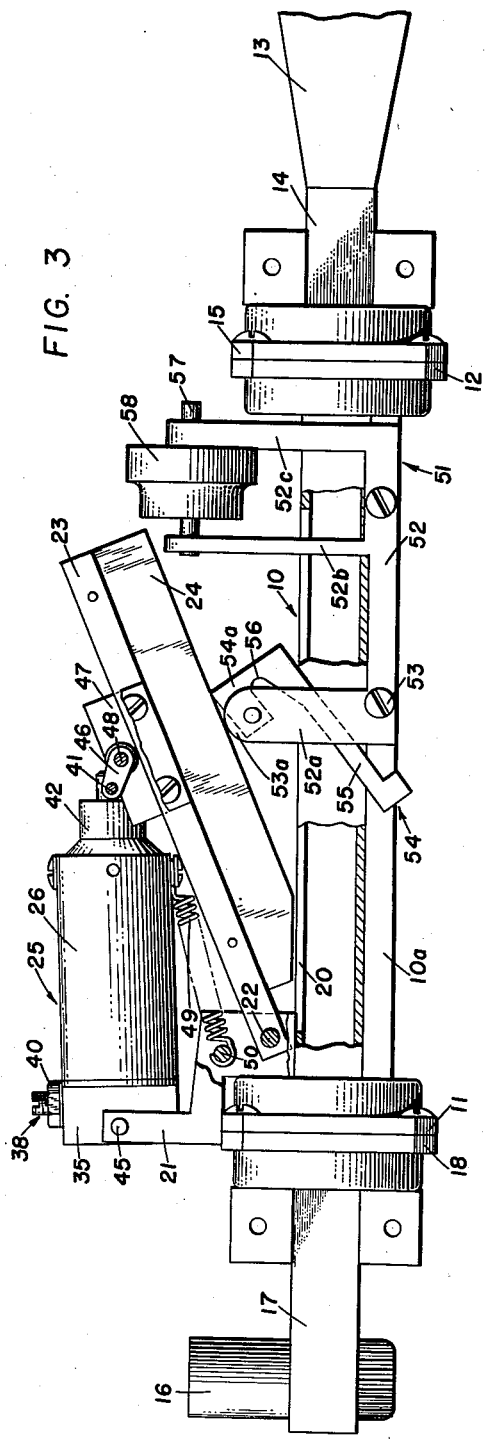

Patented Oct. 9, 1951

2,570,813

UNITED STATES PATENT OFFICE 2,570,813

WAVE GUIDE ATTENUATOR

Wilbur A. Joerndt, Silver Spring, Md., and Roland W. Larson, Marshfield, Wis., assignors to the United States of America as represented by the Secretary of the Navy Application October 8, 1948, Serial No. 53,542

3 Claims. (Cl. 178—44)

The present invention relates generally to radio direction and ranging (radar) and more particularly to an attenuator for a radar receiving antenna. Still more specifically, the invention relates to an automatically variable attenuator for use in connection with a radar receiver mounted in a guided missile or other projectile for maintaining a substantially constant power input to the receiver as the missile moves with respect to a signal source.

In certain guided missiles, control is effected by radar. Broadly stated, such control involves the use of radio receiving apparatus in the missile, as well as transmitting equipment located remotely therefrom, said receiving apparatus including a detector, an amplifier and various electro-mechanical translating devices. The receiver detector usually comprises a crystal rectifier which is mounted in a wave guide section and is positioned near the receiving antenna which, in some arrangements, is constituted by a horn. The entire assembly is mounted in the missile, with the horn directed rearwardly. For best results, control of the missile must be effectuated as soon as possible after it is launched. Such control introduces a difficulty in that the power necessary for control at a distance is too great at the launching location, with the result that the detector crystal may be ruined. Accordingly, it is necessary to attenuate the received signal at the start approximately in proportion to its strength in order to prevent overloading of the crystal. Moreover, since the received power varies inversely as the square of the distance from the transmitter, said attenuation must be varied in a like manner.

One of the principal objects of the present invention, therefore, is to provide an attenuator for the purpose set forth which will operate to prevent ruination of radar receiver detector crystals by strong radio control signals.

It is another object of the invention to provide means for attenuating a signal received by a guided missile in such a manner that said missile guiding means will receive a signal of optimum strength throughout its flight.

A further object of the invention is to provide a simple and highly efficient attenuator which embodies but few working parts, is readily adaptable for connection in a standard wave guide line, and may be readily preadjusted.

Still another object of the invention is to provide a device for the purpose set forth which will be entirely automatic in operation and which will, therefore, function to attenuate a received signal immediately upon launching of a missile.

And a further object of the invention resides in the provision, in an attenuator for the purpose set forth, of simple and highly efficient releasing means.

Other objects and many of the attendant advantages of this invention will be readily appreciated as the same becomes understood by reference to the following detailed description when considered in connection with the accompanying drawings, wherein:

Fig. 3 is an enlarged side elevation, partly in section, showing the device with the attenuator element and associated mechanism in minimum attenuating position;

Fig. 4 is an enlarged side elevation similar to Fig. 3, but showing the attenuator mechanism in maximum attenuating position;

Figure 1:
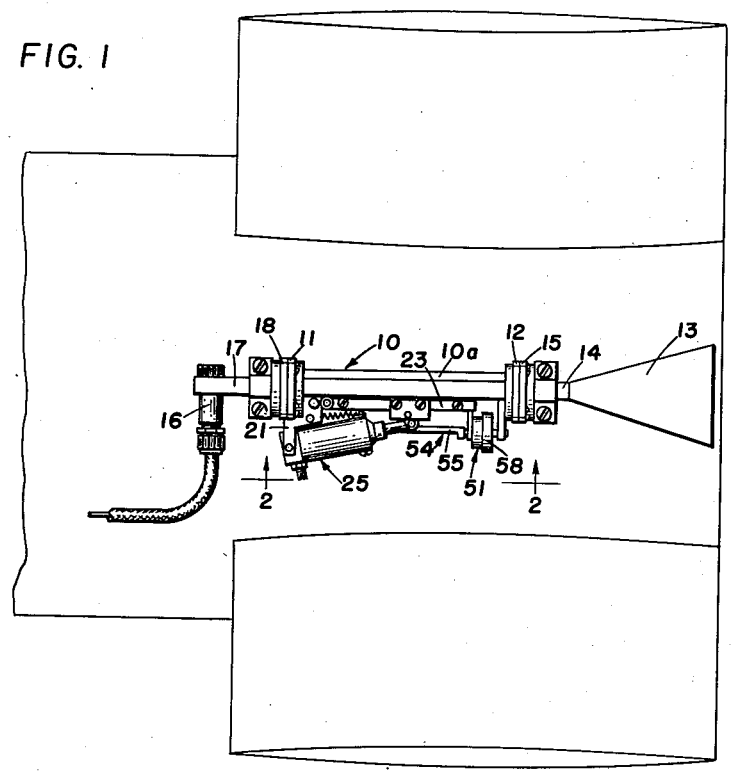
Fig. 1 is a side elevation of the invention installed on a guided missile and mounted in a wave guide between the antenna horn and the crystal detector, the attenuator element employed being shown in unreleased, full attenuating, position.

Stated briefly, the present invention attains the objects enumerated hereinabove by providing simple means constituted principally by a straight blade pivoted to swing, through a longitudinally arranged slot in a wave guide section, into and out of the guide from a full attenuating to a full non-attenuating position, a spring-operated, dashpot-damped blade shifting mechanism, and adjustable, inertia operated mechanism for releasing the blade shifting mechanism when the missile on which the attenuator is mounted is launched. The shifting mechanism is adjustable in such a manner that the time required for movement of the blade from attenuating to non-attenuating positions may be predetermined to suit the particular conditions under which missile control is to be effectuated.

Referring now to the drawings in detail, a wave guide section, which constitutes the body or frame of the invention, is shown at 10. The section 10 is provided with a base member 10a, and at corresponding ends of said section and base member are connecting flanges 11 and 12.

A receiving horn 13, of conventional generally frusto-pyramidal design, is connected to the section 10 by a wave guide section 14, which is provided with a flange 15 bolted to the flange 12. Similarly, a crystal detector 16, mounted on a wave guide section 17, is connected to the opposite end of the section 10. The section 17 is provided with a flange 18 which is bolted to the flange 11.

Figure 5:
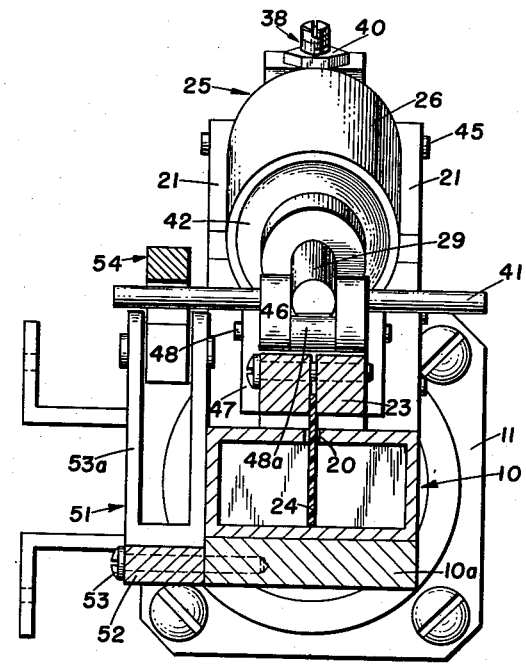
Fig. 5 is a vertical sectional view, still further enlarged, on the line 5—5 of Fig. 4.

As best seen in Figures 3, 4 and 5 of the drawings, the top wall of the wave guide section 10 is formed, medially of its width, with a longitudinally extending slot 20, the purpose for which will be pointed out in detail hereinafter.

A yoke 21, of generally Z shape, is mounted on the section 10 and flange 11, and pivotally mounted between the lower arms of said yoke, by a pin 22, is an attenuator having a clamp or stiffening channel-member 23 which carries an attenuator blade or element 24. The element 24 may be swung into and out of the slot to attenuate the signal passing through the guide. As best seen in Fig. 3, the lower corner of the end of the element nearest the yoke 21 is beveled, or cut away so that no part of said element extends into the slot when the attenuator is fully retracted.

Figure 6:
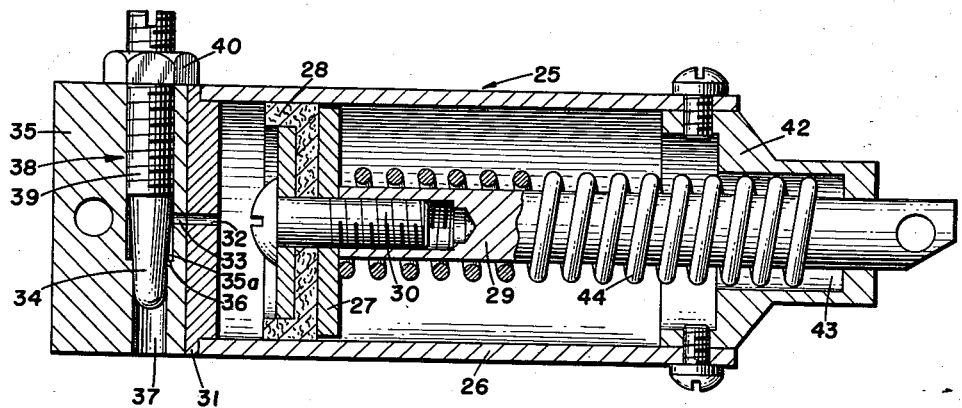
Fig. 6 is an enlarged detail sectional view of the dashpot forming a part of the release mechanism.

The mechanism for swinging the clamp and attenuator element to raised, non-attenuating position includes a dashpot 25, the construction of which is best shown in Figure 6. By referring to this view it will be seen that the dashpot includes a cylinder 26 in which is mounted a piston 27 having a preferably leather washer 28. The piston 27 and washer 28 are secured to a plunger 29 by a bolt 30.

The end wall 31 of the dashpot cylinder 26 is formed with a port 32 which registers with an intake port 33 of a valve 34 carried in a mounting block 35 suitably secured to the outer surface of said wall 31. The valve 34 includes a cylindrical chamber 35a reduced near one end to define a valve seat 36 and a discharge port 37. A stem 38 is formed with a rounded inner end, for cooperation with the valve seat 36, and with an enlarged threaded rear portion 39 mating with a threaded course in the block 35. The outer end of the portion 39 is slotted to receive a screw driver bit and a lock nut 40 is provided for securing the stem 38 against accidental displacement.

The plunger is provided, near its free end, with a transverse pin 41. As will be seen, the pin 41 extends at each side of the plunger 29, for a reason to be explained in detail hereinafter. The plunger 29 extends through a head 42 which closes the cylinder 26 at its forward end. The head 42 is extended and recessed to define a cup 43, and surrounding the plunger is a coil spring 44 having one end engageable with the face of the piston 27 and its opposite end engageable with the end wall of the cup, a substantial portion of the spring being positioned in the cup. As will be obvious, the spring 44 urges the piston toward the rear wall 31 of the cylinder.

By referring again to Figures 1 to 5 of the drawings, it will be seen that the block 35 is pivotally mounted between the arms of the yoke 21, near their free ends, by a pin 45.

Figure 2:
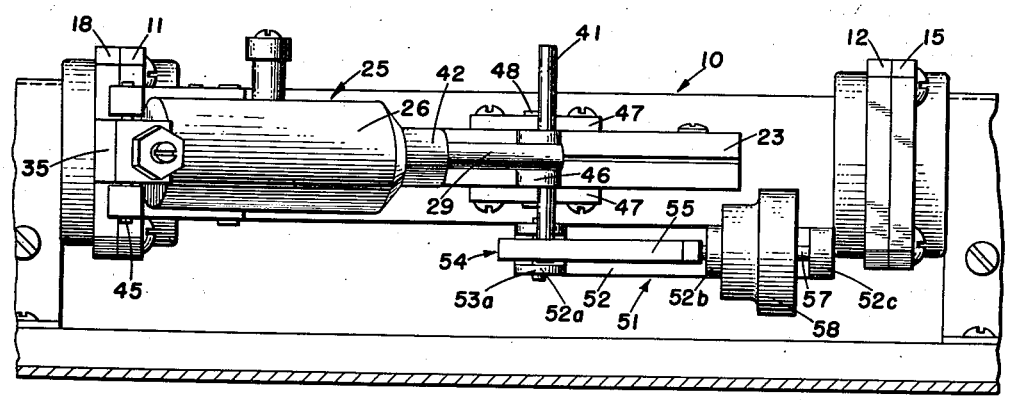
Fig. 2 is an enlarged elevation, at right angles to that shown in Fig. 1, partly in section, on the line 2—2 of Figure 1.

The plunger 29 is pivotally connected to the clamp 23 by a link 46, best seen in Figures 2 and 5, said link having one end straddling the free end of the plunger and pivotally mounted thereon by pin 41, and its other end pivotally mounted between a pair of plates 47 on the clamp 23 by a pin 48. A sleeve 48a spaces the arms of the link apart. The link connection between the plunger and the clamp is necessary to afford a limited amount of "play," to prevent "freezing" of said plunger.

A retractile spring 49 is tensioned between the forward end of the cylinder of the dashpot 25, therebeneath, as shown in Fig. 1, and a pin 50 carried by the midsection of the yoke 21, and serves to retain said cylinder and the attenuator under tension.

The attenuator element 24 is initially held in full attenuating position by release mechanism now to be described. The release mechanism is shown generally at 51 and includes a generally E-shaped frame or bracket 52 the long shank of which is secured to one side wall of the section 10 by screws 53. As best seen in Figs. 2 and 5, an arm 52a of the bracket is shaped to define a yoke 53a having spaced arms, pivotally mounted between which is one end of a latch member 54. The latch member includes a hub 54a and a finger 55 which is connected to the hub by a web defining a crotch 56, the walls of which are inclined. As best seen in Figures 1 and 2 of the drawings, the finger 55 when in latching position lies in generally parallel spaced relation to the long shank of the bracket 52. The finger 55 is thickened at its free end and formed with a socket, for a purpose soon to become evident.

The bracket 52 includes an intermediate arm 52b and an end arm 52c which are apertured near their free ends freely to receive a latch pin 57, one end of which is removably engageable in the socket in the end of the finger 55. A weight 58, of suitable mass, is secured to the pin 57 between the intermediate arm and the arm 52c and is so designed that it will be movable between said arms for shifting an end of said pin 57 into or out of engagement with the finger 55.

The operation of the invention will now be described.

The device is first adjusted, within or on the guided missile, to place the attenuator with the element 24 in full attenuating position. That is, the element 24 is fully extended into the slot 20. In this position the plunger 29 is fully projected and the spring 44 (Figure 6) is fully compressed. The plunger and element are maintained in the position above described by the engagement of the finger 55 with one end of the pin 41, said pin being disposed against the outermost inclined wall of the crotch 56, the confronting end of the pin 57 being in the socket in the thickened free end of said finger.

When the missile is launched, the weight 58 and the pin 57 secured thereto will slide, by inertial forces, toward the end arm 52c, for withdrawing the end of the pin 57 from the socket in the end of the latch finger 55 and releasing said latch. The latch flies over, by the action of the spring 44, to release the transverse pin 41. Upon release of said pin 41, the spring 44 forces the piston 27 away from the head 42 of the dashpot, applying pressure to fluid in the dashpot and drawing in the plunger 29. The initial movement of the plunger produces partial rotation of the link 46 about the pin 48. This motion is provided to take up any play in the dashpot assembly. When the transverse pin has reached the limit of its motion, i. e., when it has been brought into contact with the plates 47 by action of the link 46 rotating about the pin 48, further motion of the plunger 29 produces angular movement of the attenuator cylinder about the pin 45, removing the element from the slot in the wave guide and reducing attenuation of energy passing therethrough. The rate of this removal is controlled by the adjustable valve in the block 35, which regulates the escape of air from the cylinder and hence the speed of the plunger 29. The valve is adjusted to produce a removal rate which will completely remove the attenuator element when the missile reaches a position where the received signal energy can not damage the crystal.

Obviously many modifications and variations of the present invention are possible in the light of the above teachings. It is therefore to be understood that within the scope of the appended claims the invention may be practiced otherwise than as specifically described.

We claim:

1. In an attenuator for use with an ultra high frequency radio receiver having a crystal detector, a receiving antenna, a wave guide connecting said antenna to said detector to convey the received signals to said crystal, said wave guide having a slot passing through its wall and extending substantially longitudinally of the guide, a sheet of electrically conductive material, means supporting said sheet for pivotal motion through the slot, resilient means tending to withdraw the said sheet from the wave guide, a latch initially holding the sheet fully projected into the wave guide, and means actuable by inertia to release said latch.

2. In an attenuator for use with an ultra high frequency radio receiver having a crystal detector, a receiving antenna, a wave guide connecting said antenna to said detector to convey the received signals to said crystal, said wave guide having a slot passing through its wall and extending substantially longitudinally of the guide, a sheet of electrically conductive material, stiffening means supporting said sheet for pivotal motion through the slot, resilient means tending to withdraw the said sheet from the wave guide, a dashpot device opposing motion of said sheet, a latch initially holding the sheet fully projected into the wave guide, and means actuable by inertia to release said latch, whereupon the resilient means withdraws the sheet from the wave guide at a rate modified by the dashpot.

3. In an attenuator for use with an ultra high frequency radio receiver having a crystal detector, a receiving antenna, a wave guide connecting said antenna to said detector to convey the received signals to said crystal, said wave guide having a slot passing through its wall and extending substantially longitudinally of the guide, a sheet of electrically conductive material, a stiffening member extending along one edge of the sheet and supporting said sheet for pivotal motion through the slot, a spring tending to withdraw the said sheet from the wave guide, a latch initially holding the sheet fully projected into the wave guide, adjustable retarding means resisting the motion of said sheet and means actuable by inertia to release said latch, whereupon the spring withdraws the sheet from the wave guide at a rate controlled by the strength of the spring and the resistance of the adjustable retarding means.

WILBUR A. JOERNDT.
ROLAND W. LARSON.

REFERENCES CITED

The following references are of record in the file of this patent:

UNITED STATES PATENTS

| Number | Name | Date |
| --- | --- | --- |
| 2,461,158 | Hollingsworth et al. | Feb. 8, 1949 |

OTHER REFERENCES

Practical Analysis of Ultra High Frequency, by J. R. Meagher and H. J. Markley, Copyright 1943, 2nd edition, RCA Service Company, Inc., p. 17. (Copy in Division 69).